United States Patent
Fleuriot et al.

(10) Patent No.: US 10,233,777 B2
(45) Date of Patent: Mar. 19, 2019

(54) FIRST STAGE TURBINE VANE ARRANGEMENT

(71) Applicant: ANSALDO ENERGIA SWITZERLAND AG, Baden (CH)

(72) Inventors: Fabien Fleuriot, Rosenau (FR); Hans-Christian Mathews, Zürich (CH); Andrey Chukin, Moscow (RU)

(73) Assignee: ANSALDO ENERGIA SWITZERLAND AG, Baden (CH)

(*) Notice: Subject to any disclaimer, the term of this patent is extended or adjusted under 35 U.S.C. 154(b) by 362 days.

(21) Appl. No.: 15/222,432

(22) Filed: Jul. 28, 2016

(65) Prior Publication Data
US 2017/0030219 A1   Feb. 2, 2017

(30) Foreign Application Priority Data

Jul. 28, 2015   (EP) .................................... 15178565

(51) Int. Cl.
*F01D 25/12*   (2006.01)
*F01D 9/04*    (2006.01)
(Continued)

(52) U.S. Cl.
CPC ............ *F01D 25/12* (2013.01); *F01D 9/023* (2013.01); *F01D 9/041* (2013.01); *F02C 7/12* (2013.01);
(Continued)

(58) Field of Classification Search
CPC ......... F05D 2240/35; F05D 2220/3212; F01D 25/12; F01D 9/041; F01D 9/02;
(Continued)

(56) References Cited

U.S. PATENT DOCUMENTS 2,743,579 A * 5/1956 Gaubatz .................. F01D 9/023
                                                    415/177
2,994,196 A * 8/1961 Bonsall et al. ......... F01D 9/023
                                                    60/748
(Continued)

FOREIGN PATENT DOCUMENTS

EP   1 903 184 A2   3/2008
EP   2 375 167 A2   10/2011
(Continued)

OTHER PUBLICATIONS

European Search Report dated Jan. 8, 2016, by the European Patent Office in corresponding European Patent Application No. 15 17 8565.

*Primary Examiner* — Todd E Manahan
*Assistant Examiner* — Eric Linderman
(74) *Attorney, Agent, or Firm* — Buchanan Ingersoll & Rooney PC

(57) ABSTRACT

A first stage vane arrangement having an array of first stage vanes and an array of frame segments and method for cooling frame segments of the first vane arrangement of a gas turbine are disclosed. The frame segments are designed for axially receiving aft ends of a combustor transition pieces. The first stage vanes include extended vanes, each vane having a leading section, a trailing edge, and an airfoil extending between an outer platform and an inner platform. The frame segments having an I-beam with an upper horizontal element, a lower horizontal element, and a vertical web. The vertical web having a downstream face facing towards a first stage of a turbine when installed in a gas turbine. The downstream face of the vertical web of at least one of the frame segments overlaps, at least partially, the leading section of at least one of the extended vanes.

12 Claims, 5 Drawing Sheets

(51) Int. Cl.
*F01D 9/02* (2006.01)
*F23R 3/60* (2006.01)
*F02C 7/12* (2006.01)
*F23R 3/34* (2006.01)

(52) U.S. Cl.
CPC ...... *F05D 2220/32* (2013.01); *F05D 2240/12* (2013.01); *F05D 2260/20* (2013.01); *F23R 3/346* (2013.01); *F23R 3/60* (2013.01)

(58) Field of Classification Search
CPC .......... F01D 9/023; F01D 9/065; F23R 3/346; F23R 3/60
See application file for complete search history.

(56) References Cited

U.S. PATENT DOCUMENTS

| | | | | |
|---|---|---|---|---|
| 3,018,624 | A * | 1/1962 | Massey | F01D 9/023 60/39.37 |
| 4,016,718 | A * | 4/1977 | Lauck | F01D 9/023 60/39.37 |
| 6,162,014 | A * | 12/2000 | Bagepalli | F01D 11/005 277/630 |
| 7,930,891 | B1 * | 4/2011 | Brostmeyer | F01D 9/023 415/209.2 |
| 8,142,142 | B2 * | 3/2012 | Zborovsky | F01D 9/023 415/185 |
| 8,398,090 | B2 * | 3/2013 | McMahan | F01D 9/023 277/643 |
| 8,562,000 | B2 * | 10/2013 | Moehrle | F01D 9/023 277/644 |
| 2004/0060298 | A1 * | 4/2004 | Han | F01D 9/02 60/772 |
| 2005/0079060 | A1 * | 4/2005 | MacManus | F01D 5/141 416/235 |
| 2006/0288707 | A1 * | 12/2006 | Weaver | F01D 9/023 60/796 |
| 2009/0115141 | A1 | 5/2009 | Simmons | |
| 2010/0037617 | A1 * | 2/2010 | Charron | F01D 9/023 60/752 |
| 2010/0054928 | A1 * | 3/2010 | Schiavo | F01D 9/023 415/182.1 |
| 2010/0115953 | A1 * | 5/2010 | Davis, Jr. | F01D 9/023 60/737 |
| 2010/0122538 | A1 * | 5/2010 | Ning | F01D 9/023 60/806 |
| 2010/0313567 | A1 * | 12/2010 | Nakamura | F01D 9/023 60/722 |
| 2011/0116937 | A1 * | 5/2011 | Sakamoto | F01D 5/186 416/97 R |
| 2011/0247314 | A1 * | 10/2011 | Chila | F23R 3/346 60/39.281 |
| 2012/0085103 | A1 * | 4/2012 | Lacy | F01D 9/023 60/796 |
| 2012/0247125 | A1 * | 10/2012 | Budmir | F01D 9/023 60/805 |
| 2013/0115048 | A1 * | 5/2013 | Flanagan | F01D 9/023 415/110 |
| 2013/0236301 | A1 * | 9/2013 | Chen | F01D 9/023 415/185 |
| 2013/0291548 | A1 * | 11/2013 | Ingram | F02C 9/16 60/772 |
| 2014/0030064 | A1 * | 1/2014 | Bangerter | F23R 3/06 415/115 |
| 2014/0109578 | A1 * | 4/2014 | Bothien | F01D 9/023 60/722 |
| 2014/0109579 | A1 * | 4/2014 | Dusing | F01D 9/023 60/722 |
| 2014/0216055 | A1 * | 8/2014 | Sakamoto | F23R 3/283 60/796 |
| 2014/0245746 | A1 * | 9/2014 | Srinivasan | F02C 7/18 60/779 |
| 2014/0260318 | A1 * | 9/2014 | Willis | F23R 3/002 60/796 |
| 2015/0101345 | A1 * | 4/2015 | Green | F01D 9/02 60/799 |
| 2015/0184528 | A1 * | 7/2015 | Belsom | F01D 9/023 60/800 |
| 2016/0153292 | A1 * | 6/2016 | Fleuriot | F01D 9/023 60/796 |
| 2016/0153294 | A1 * | 6/2016 | Graf | F01D 9/023 415/208.2 |
| 2017/0030267 | A1 * | 2/2017 | Thackway | F16J 15/022 |
| 2017/0284210 | A1 * | 10/2017 | Bartley | F01D 9/023 |
| 2017/0314405 | A1 * | 11/2017 | Hettinger | F01D 9/023 |
| 2018/0209282 | A1 * | 7/2018 | Sakamoto | F23R 3/42 |

FOREIGN PATENT DOCUMENTS

| | | |
|---|---|---|
| EP | 2 511 612 A1 | 10/2012 |
| EP | 2 725 196 A1 | 4/2014 |
| JP | 62-121835 A | 6/1987 |
| JP | 2001-289003 A | 10/2001 |

* cited by examiner

FIRST STAGE TURBINE VANE ARRANGEMENT

TECHNICAL FIELD

The disclosure relates to first stage vane arrangement for receiving a combustor transition piece which guides hot gases from the combustor to the turbine at the interface from a combustor to a turbine.

BACKGROUND OF THE DISCLOSURE

Gas turbines with can combustors are known from various applications in power plants. Different gas turbines with can-annular combustor arrangements are known. Typically a plurality of combustors is disposed in an annular array about the axis of the turbine. Hot combustion gases flow from each combustor through a respective transition piece into the first stage vane. In addition to relative movement, e.g. due to dynamic pulsing between these components, the transition pieces and first stage vane are made of different materials and are subjected to different temperatures during operation, thereby experiencing different degrees of thermal growth. To allow such a "mismatch" at the interface of the transition pieces and the first stage vane support frames which support and guide the transition piece at the turbine inlet have been proposed. To allow movement between the transition piece and the support frames the US 2009/0115141 A1 suggests the use of sealed slots. It teaches the use of a remaining leakage to cool the transition piece and support frame.

However, the leakage can change during operation and cannot be guided to effectively cool all regions of the support frame. Thus, an effective sealing cannot be applied and large amounts of cooling gas can be lost in such an arrangement. In addition, the vanes of the first stage of a gas turbine are directly exposed to the hot combustion gases, and they also require a significant amount of cooling gas.

What is needed is an arrangement that can provide benefits of having an effective transition region between the combustor and the turbine, but at same time this arrangement should have reduced cooling needs compared to known solutions.

SUMMARY OF THE DISCLOSURE

A first stage vane arrangement is suggested in order to ensure efficient cooling of a transition piece—turbine interface having a picture frame receptacle for axially receiving an aft end of a transition piece with minimum use of cooling gas. In addition, means to reduce dynamic pulsations are proposed. Hence, lifetime is increased and power and efficiency losses due to large cooling gas consumption, as well as increased emissions due to uncontrolled cooling gas flows, are avoided.

The present disclosure relates to a combustor transition piece from a can combustor to the turbine inlet adapted to guide combustion gases in a hot gas flow path extending between a gas turbine can combustor and a first stage of turbine. The combustor transition piece comprises a duct having an inlet at an upstream end adapted for connection to the can combustor and an outlet at a downstream end adapted for connection to a first stage of a turbine. Typically each outlet is inserted into a picture frame receptacle formed by a frame segment. The downstream end comprises combustor transition walls, typically an outer wall, an inner wall, as well as two combustor transition side walls.

The inlet of a combustor transition typically has the same cross section as the can combustor to which the transition piece is attached. These can for example be a circular, an oval or a rectangular cross section. The outlet typically has the form of a segment of an annulus. A plurality of combustor transitions installed in the gas turbine form an annulus for guiding the hot gas flow into the turbine.

It is one object of the present invention to provide a first stage vane arrangement having an array of first stage vanes and a plurality of frame segments, in which the design of the arrangement allows to reduce a total amount of cooling fluid needed to cool the vanes and the frame segments.

Another object of the present invention is to provide a first stage vane arrangement which can reduce or eliminate thermoacoustic communication between cans of a combustor.

The above and other objects of the invention are achieved by a first stage vane arrangement having an array of first stage vanes, and an array of frame segments for axially receiving aft ends of a combustor transition pieces. The first stage vanes comprise a plurality of extended vanes, each extended vane comprises a leading section, a trailing edge, and an airfoil extending between an outer platform and an inner platform; the frame segments comprise an I-beam with an upper horizontal element, a lower horizontal element, and a vertical web, the vertical web having a downstream face, facing towards a first stage of a turbine when installed in a gas turbine, wherein the downstream face of the vertical web of at least one of the frame segments is overlapping when viewed in axial direction, at least partially, the leading section of at least one of the extended vanes.

Bringing I-beam of the frame segment and the leading section of the extended vanes close to each other, the leading section of the vane is protected from the hot combustor gases, and it is needed less cooling air to cool the leading section. At the same time, the cooling air saved in this way can be used to cool the I-beam, which is additionally protected from hot gases by the leading section of the vanes. As a result, total amount of the cooling air or cooling fluid in general, is reduced.

According to one embodiment, downstream face of the vertical web of each of the frame segments is overlapping when viewed in axial direction, at least partially, the leading section of one of the extended vanes. According to one preferred embodiment, the number of the vertical webs is equal to the number of the extended vanes.

According to another preferred embodiment, the first stage vane arrangement further comprises a plurality of non-extended vanes, wherein each non-extended vane comprises a leading section, a trailing edge, and an airfoil extending between an outer platform and an inner platform. At least one of the non-extended vanes is positioned between two extended vanes. In another preferred embodiment, there are two non-extended vanes between each pair of the extended vanes.

According to a further embodiment, leading section of the extended vanes and the leading section of the non-extended vanes comprise cooling means, preferably cooling holes. The non-extended vanes use cooling means to cool their leading sections exposed to the hot combustion gases, while the extended vanes use cooling means also to cool I-beam of the segments which they are facing.

In another preferred embodiment, a first distance N1 from the leading section of the extended vanes to an edge of the inner platform is equal for all extended vanes. In addition, a second distance N2 from the leading section of the non-extended vanes to the edge of the inner platform is equal for all non-extended vanes. Preferably, the first distance N1 is smaller than the second distance N2.

According to another preferred embodiment, the leading section of at least one of the extended vanes is substantially flat. In addition, the leading section of at least one of the extended vanes may be also flat and parallel to the downstream face of at least one vertical web.

According to yet another embodiment, both the extended vanes and non-extended vanes have curved leading section. The radius of curvature of the leading section of at least one of the extended vanes is larger than the radius of curvature of the leading section of the non-extended vanes.

According to another embodiment, the leading section of at least one of the extended vanes and the frame segments are not in contact. In one embodiment, an axial distance L between the leading section of at least one of the extended vanes and the downstream face of the vertical web is between N1 and N2. In another preferred embodiment, the axial distance L between the leading section of at least one of the extended vanes and the downstream face of the vertical web is smaller than the minimum thickness of the vertical web at the downstream face.

According to yet another embodiment, the vertical web of at least one of the segments is extending in axial direction beyond the edge of the inner platform. Preferably, the leading section of at least one of the extended vanes has a convex shape and the downstream face of at least one of the vertical web has a concave shape.

Further, a gas turbine comprising such first stage arrangement is an object of the disclosure. The proposed gas turbine has at least one compressor, at least one turbine, and at least one can combustor with a transition piece and a first stage vane arrangement according to the disclosure.

Finally, the present application discloses also a method for cooling the frame segments of the first vane arrangement according to the disclosure. The method comprises steps: supplying a cooling fluid to the interior of the extended vanes, and guiding the cooling fluid to the leading section of the extended vanes. From the leading section of the extended vanes cooling fluid is ejected into a gap between the vertical web and the extended vane.

The above described combustor transition, can combustor and gas turbine can be a single combustion gas turbine or a sequential combustion gas turbine as known for example from EP 0 620 363 B1 or EP 0 718 470 A2. It can also be a combustor transition of a gas turbine with one of the combustor arrangements described in the WO 2012/136787.

BRIEF DESCRIPTION OF THE DRAWING

The invention, its nature as well as its advantages, shall be described in more detail below with the aid of the accompanying drawings. Referring to the drawings:

FIG. 1b shows the cross section b-b of the turbine inlet with combustor transitions of the gas turbine from FIG. 1a.

EMBODIMENTS OF THE DISCLOSURE

The same or functionally identical elements are provided with the same designations below. The examples do not constitute any restriction of the invention to such arrangements.

Figure 1A:
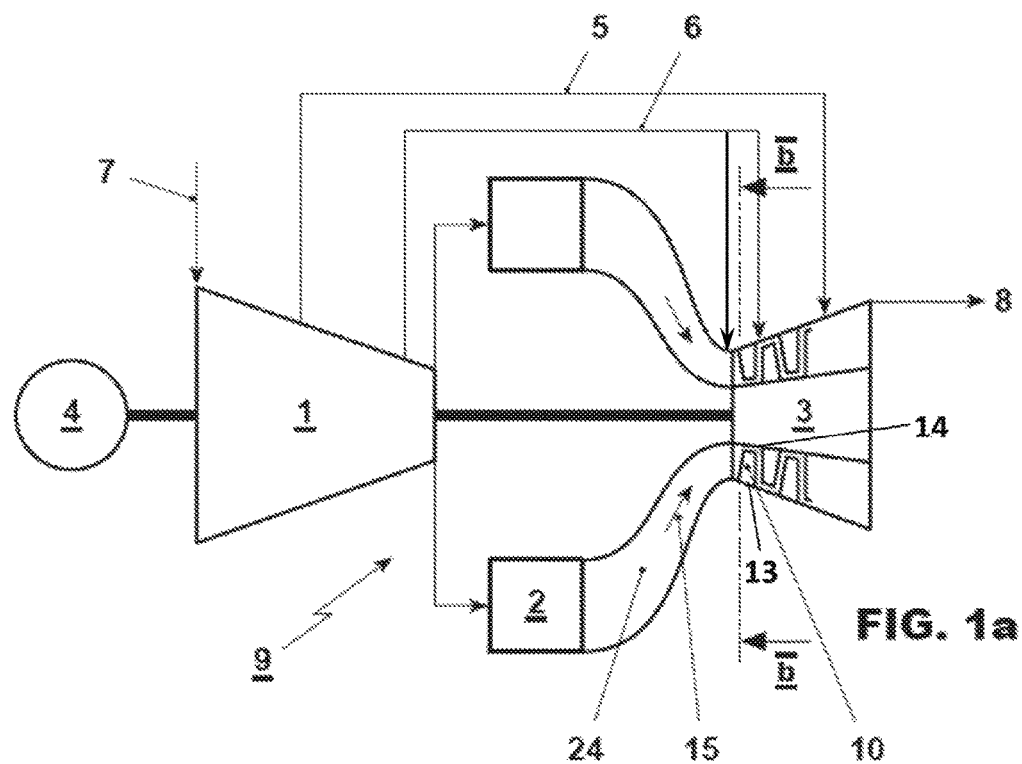
FIG. 1a shows an example of a gas turbine according to the present invention.

An exemplary arrangement is shown in FIG. 1a. The gas turbine 9 is supplied with compressor inlet gas 7. In the gas turbine 9 a compressor 1 is followed by a combustion chamber comprising a plurality of can combustors 2. Hot combustion gases are fed into a turbine 3 via a plurality of combustor transition pieces 24. The can combustors 2 and combustor transition pieces 24 form a hot gas flow path 15 leading to the turbine 3. The combustor transition pieces 24 connect the can combustors 2 of the combustion chamber with the first stage vane 10 of the turbine 3.

Cooling gas 5, 6 is branched off from the compressor 1 to cool the turbine 3, the combustor 2 (not shown) and a frame segment (not shown in FIG. 1). In this example the cooling systems for high pressure cooling gas 6 and low pressure cooling gas 5 are indicated.

Exhaust gas 8 leaves the turbine 3. The exhaust gas 8 is typically used in a heat recovery steam generator to generate steam for cogeneration or for a water steam cycle in a combined cycle (not shown).

Figure 1B:
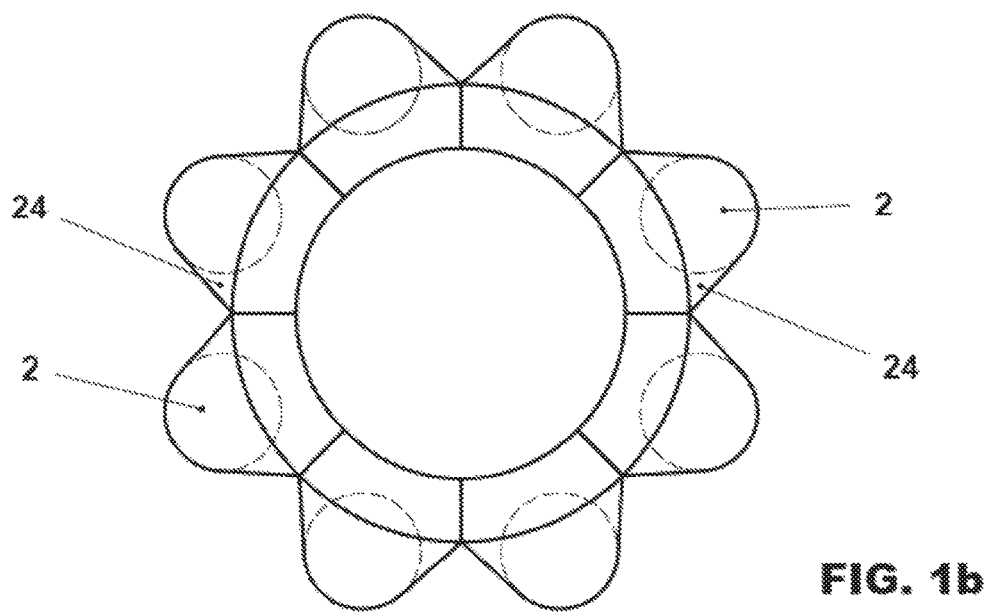

The combustor transition pieces 24 of the gas turbine 9 of the cross section b-b are shown in FIG. 1b. The combustor transition pieces 24 guide the hot gases from the can combustors 2 to the turbine 3 and are arranged to form an annular hot gas duct at the turbine inlet.

Figure 2:
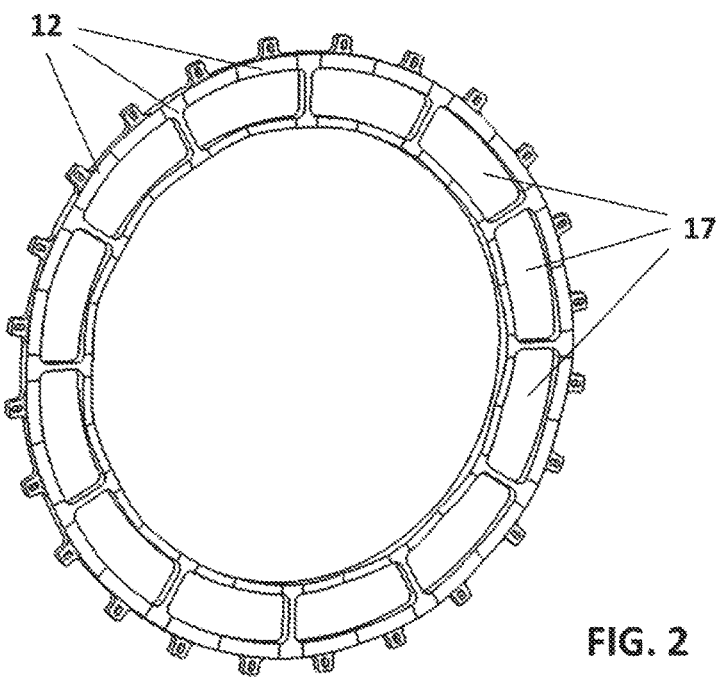
FIG. 2 shows an example of an annular arrangement of frame segments for receiving the aft ends of the transition pieces shown in FIG. 1b.

FIG. 2 shows an annular arrangement of frame segments 12 for receiving the aft ends of the combustor transition pieces 24. Neighboring pairs of frame segments 12 form a picture frame receptacle 17 which can receive an aft end or outlet of a combustor transition piece (not shown).

Figure 3:
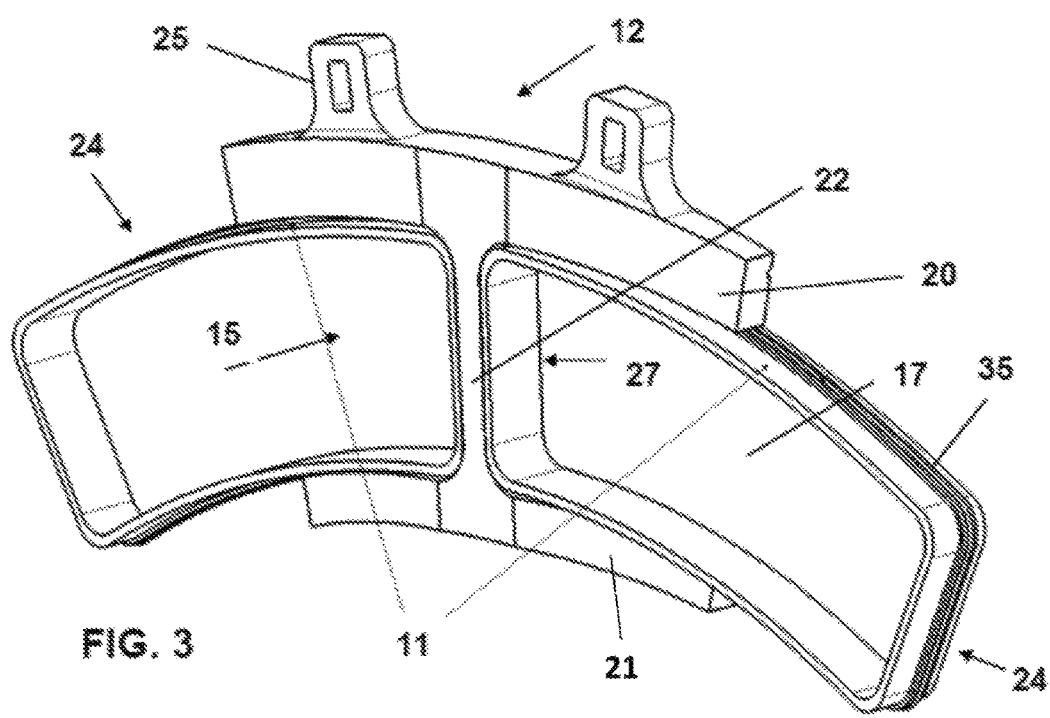
FIG. 3 shows an example of a frame segment with two transition pieces inserted.

FIG. 3 shows a perspective view of an example of a frame segment 12 with two combustor transition pieces 24 inserted. The combustor transition piece 24 is defined by the combustor transition wall 11, which confines the hot gas flow path 15. The frame segment 12 consist of a vertical web 22 with an upper horizontal element 20 arranged radially outside of the vertical web 22, and a lower horizontal element 21 arranged radially inside of the vertical web 22 when installed in a gas turbine. The frame segment 12 comprises two ears 25 for fixation to a vane carrier. They extend in radial direction from the upper horizontal element 20. The vertical web 22 has a downstream face 27. The combustor transition pieces 24 open in flow direction on both sides of the downstream face 27. A seal 35 may be arranged between the outside of the combustor transition wall 11 and the receiving frame segments 12. The gap between the combustor transition wall 11 and the receiving frame segments 12 is typically pressurized with cooling gas.

Figure 4:
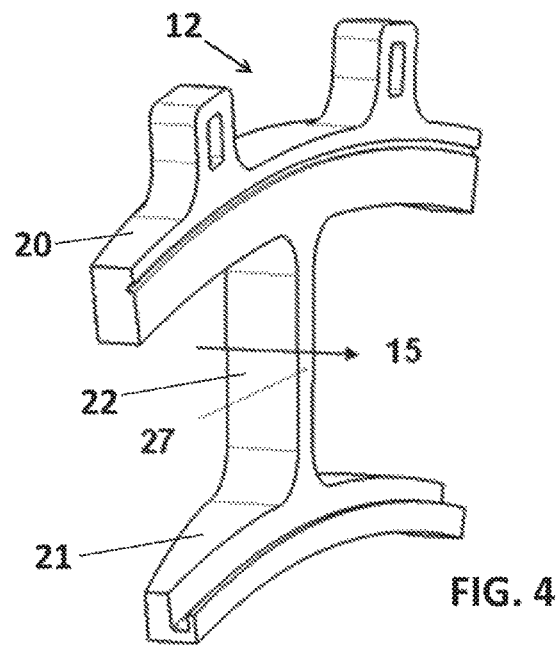
FIG. 4 shows a perspective view of an example of a frame segment of FIG. 3.

The seal 35 prevents unnecessary loss of cooling gas through this gap into the hot gas flow path 15. FIG. 4 shows another perspective view of an example of a frame segment 12 of FIG. 3; it shows the vertical web 22 with the downstream face 27 facing in the direction of the hot gas flow path.

Figure 5:
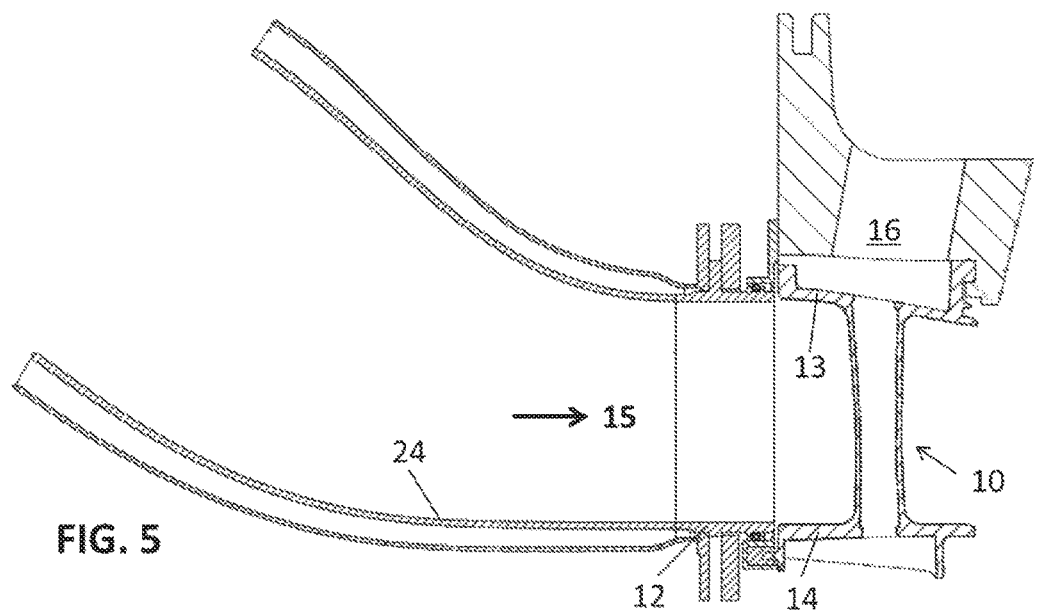
FIG. 5 is an axial sectional view of a portion of one can combustor, a transition piece, and a first stage arrangement according to the invention.

FIG. 5 shows a sectional view of a portion of one can combustor, a transition piece, and a first stage arrangement according to the invention. At the outlet of the combustor transition piece 24 the cross section of each combustor transition piece has the geometrical shape of a sector of the annulus, which forms the hot gas flow path 15 at the turbine inlet. The hot gas flow path 15 continues into the space between the first stage vanes 10 of the turbine 3. The inner platforms 14 and outer platforms 13 delimit the hot gas flow path 15 in the turbine inlet. The airfoils of the turbine vanes 10 extend in radial direction between the inner platform 14 and outer platform 13 of the vane 10 and at least partly divide the hot gas flow path 15 in the circumferential direction. At the outlet to the turbine (also called aft end) the transition pieces 24 are supported and kept in their position by frame segments 12. The frame segments 12 and the first stage vanes 10 are supported by and fixed to a vane carrier 16. High pressure cooling gas can be supplied to the frame segments 12 and first stage vanes 10.

Figure 6:
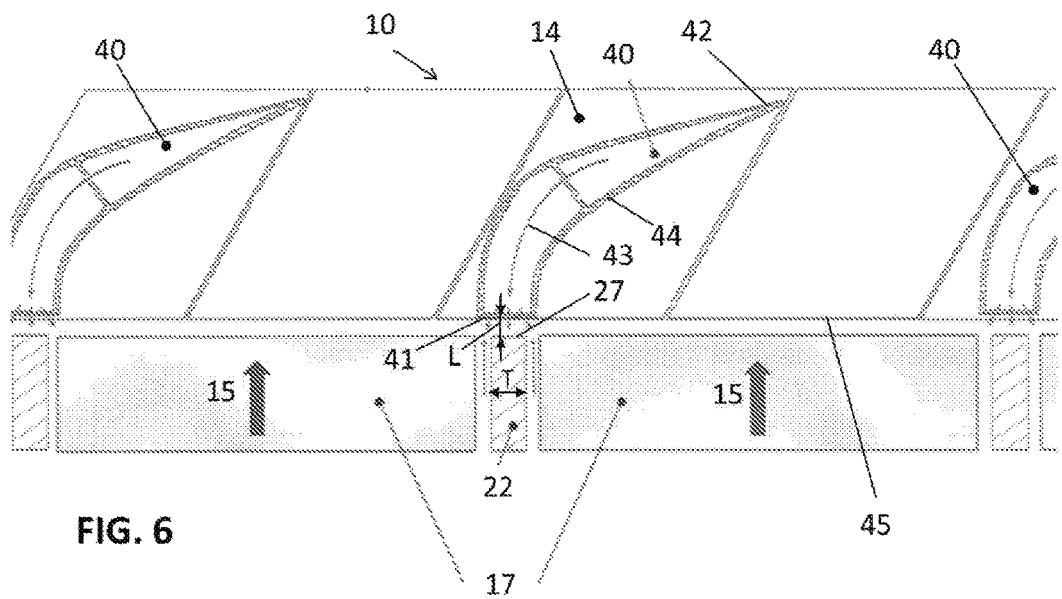
FIG. 6 is partially enlarged cross section view of an embodiment of a first stage vane arrangement according to the present invention.

FIG. 6 shows a partially enlarged cross section view of an embodiment of a first stage vane arrangement according to the present invention. Neighboring pairs of frame segments 12 form a picture frame receptacles 17 which can receive an aft end or outlet of a combustor transition piece. The downstream faces 27 of the webs 22 are exposed to hot gases 15 during operation of the gas turbine. In this example shown in FIG. 6, the arrangement has a plurality (in this case three are shown) of extended vanes 40. Each extended vane 40 comprises a leading section 41, a trailing edge 42, and an airfoil 44. The leading section 41 is connecting pressure and suction side of the extended vane 41. In general, the leading section can have flat or curved shape. As shown already in FIG. 5, the airfoil 44 is extending between an outer platform 13 and an inner platform 14. The term "extended" is used to emphasize the shape of the vane, since the upstream portions of the extended vanes 40 are extended in comparison to the standard first row vanes. The upstream portions of the extended vanes are preferably straight and parallel to each other. The arrangement comprises also a plurality of frame segments 12, where each frame segment 12 comprises an I-beam with an upper horizontal element 20, a lower horizontal element 21, and a vertical web 22. The vertical web 22 has a downstream face 27, which is facing towards a first stage of a turbine when installed in a gas turbine 9. FIG. 6 being a cross section shows a cross section of the vertical web 22 having a thickness T. In accordance to the preferred embodiment of the present invention, the downstream face 27 of the vertical web 22 of the frame segments 12 is overlapping when viewed in axial direction the extended vane 40. By overlapping, it is meant that the downstream face 27 and the vertical web have a common plane in the axial direction. FIG. 6 shows the example where the extended vane 40 and the downstream face 27 are completely overlapping when viewed in axial direction. However, they may also overlap each other only partially. In the preferred embodiment each of the extended vanes 40 is overlapping when viewed in axial direction corresponding downstream face 27 of one of the webs 22. In the preferred embodiment, the number of the extended vanes 40 is equal to the number of the webs 22.

In the operation, a cooling fluid 43 is supplied to the internal cavity of the extended vanes 40. In one embodiment, the cooling fluid 43 is air. Since the leading section 41 is not exposed directly to the hot gas flows 15, the cooling fluid 43 can be also used to cool the downstream face 27 of the web 12. To facilitate the cooling, the extended vanes may have a cooling means, preferably cooling holes in the leading section 41. In this way the amount of the cooling air for the vanes 40 and segments 12 is reduced. In the preferred embodiment, for each segment 12 there is one extended vane 40.

The axial distance (L) from the leading section 41 to the downstream face 27 may vary. In one preferred embodiment according to the invention, the leading section 41 is positioned at an edge 45 of the inner platform 14. In one preferred embodiment, the axial distance (L) may be smaller than the minimum thickness (T) of the web 22 at the downstream face 27. The closer the axial distance L the smaller are gaps between adjacent cans, which can significantly reduce or eliminate thermoacoustic communication between cans. In the preferred embodiment, the leading section 41 of at least one of the extended vanes 40 and the frame segments 12 are not in contact, i.e. the axial distance (L) is larger than zero.

Figure 7:
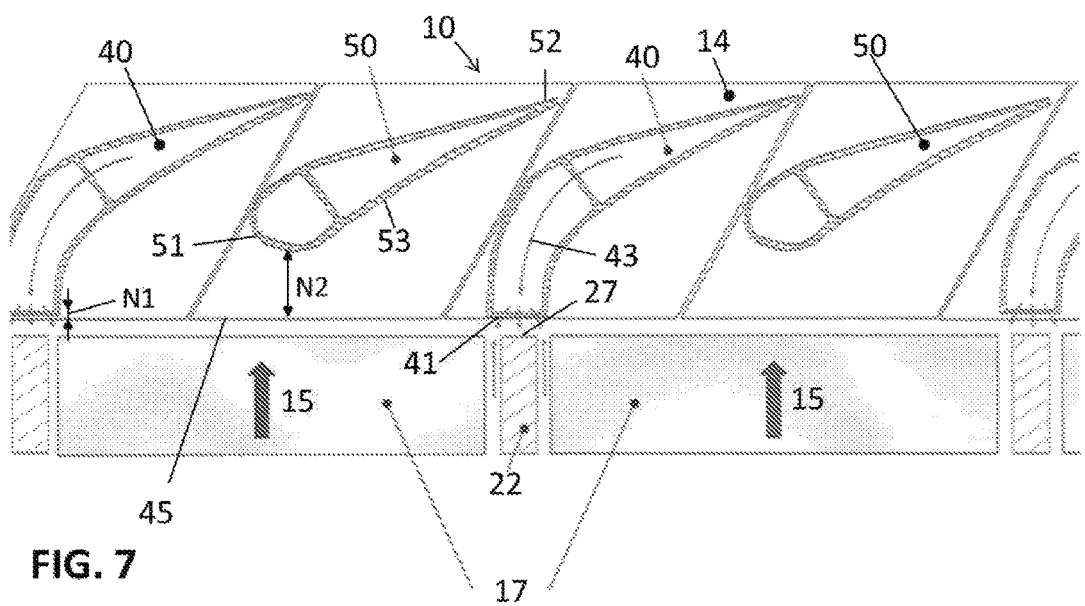
FIG. 7 is partially enlarged cross section view of another embodiment of a first stage vane arrangement according to the present invention.

FIG. 7 shows a partially enlarged cross section view of another preferred embodiment of a first stage vane arrangement according to the present invention. The configuration of extended vanes is similar to the configuration shown in FIG. 6. Contrary to the first embodiment shown in FIG. 6, this embodiment comprises also a plurality of non-extended vanes 50. Each non-extended vane 50 comprises a leading section 51, a trailing edge 52, and an airfoil 53 extending between an outer platform 13 and an inner platform 14. At least one of the non-extended vanes 50 is positioned between two extended vanes 40. The term "non-extended" is used to emphasize that these vanes have a standard vane shape used in the first vane row of a gas turbine. Non-extended vanes are directly exposed to the hot combustion gases 15, and they are not contributing to the cooling of the I-beams of the segments 12.

However, they have their original function of guiding the hot combustion gases. The shapes of the trailing edges 52 and 42 are preferably similar to keep flow direction of the combustion gases unaltered. First distance N1 from the leading section 41 of the extended vanes 40 to an edge 45 of the inner platform 14 is preferably equal for all extended vanes 40. Similarly, the second distance N2 from the leading section 51 of the non-extended vanes 50 to the edge 45 of the inner platform 14 is equal for all non-extended vanes 50. Preferably, as shown in FIG. 7, the second distance N2 from the leading section of the non-extended vanes 50 to the edge 45 of the inner platform 14 is larger than the first distance N1 from the leading section of the extended vanes 40 to the edge 45 of the inner platform 14. It is clear from FIG. 7 that the downstream face 27 is not overlapping when viewed in axial direction the leading section 51 of the non-extended vane 51.

Figure 8:
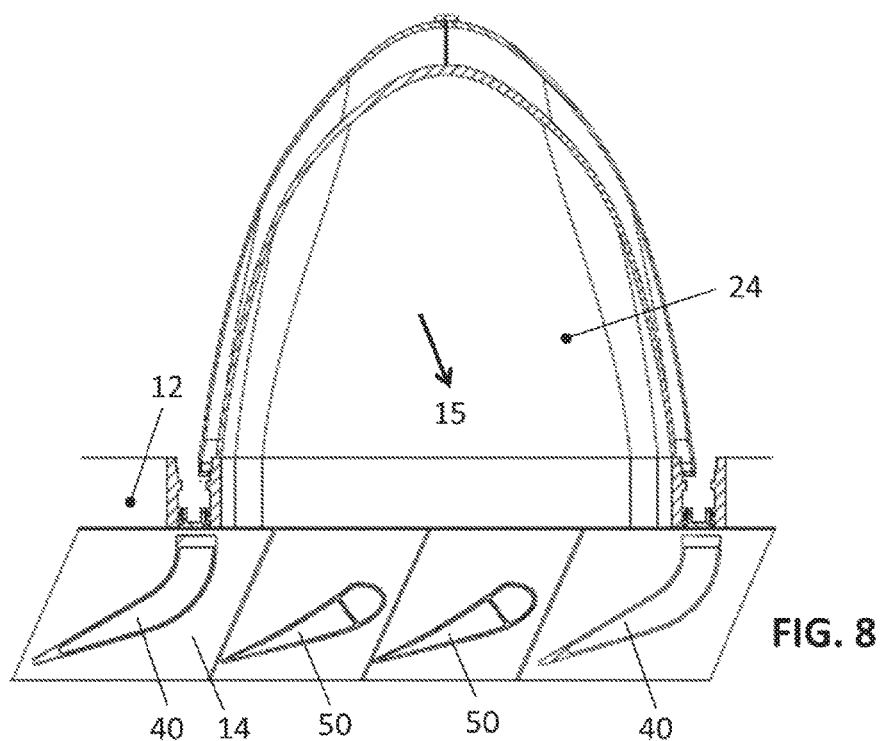
FIG. 8 is a sectional view of a portion of a gas turbine comprising a first stage arrangement according to the invention.

FIG. 8 shows a partially enlarged cross section view of a portion of a gas turbine comprising a first stage arrangement according to the invention. In this embodiment according to the invention, there are two non-extended vanes 50 between two extended vanes 40. In general number of non-extended vanes depends on the gas turbine design, and the number is not limited by the shown embodiments.

Figure 9:
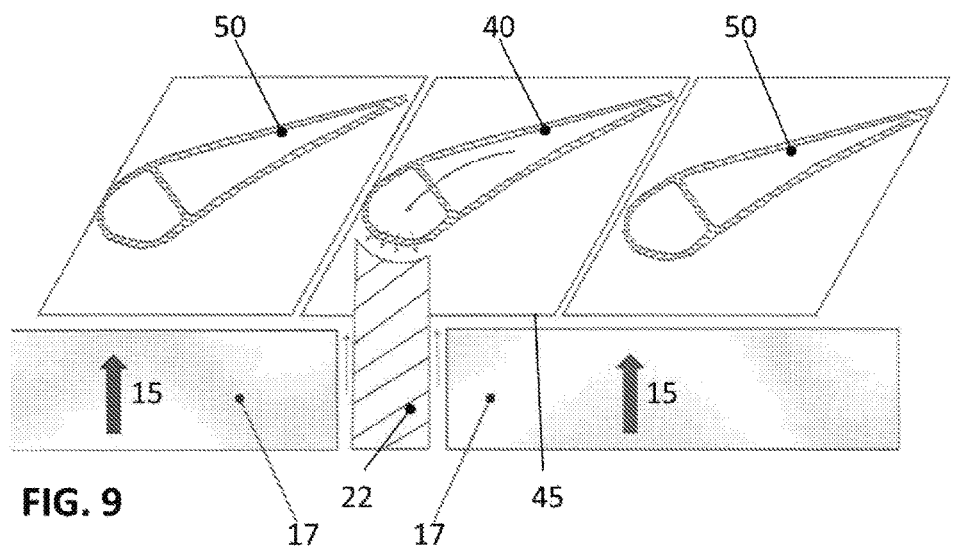
FIG. 9 is partially enlarged cross section view of an embodiment of a first stage vane arrangement according to the present invention.

FIG. 9 shows partially enlarged cross section view of an embodiment of a first stage vane arrangement according to one embodiment of the present invention. In this embodiment according to the invention, the vertical web 22 of at least one of the segments 12 is extending in axial direction beyond the edge 45 of the inner platform 14. FIG. 9 shows an example where non-extended vanes 40 and extended vanes are substantially similar vanes. In the preferred embodiment, the leading section of the extended vane 40 has a convex shape and the downstream face 27 of the vertical web 22 has a concave shape. Other combinations are also possible. For example, the leading section 41 of the extended vanes 40 and/or the downstream face 27 of the vertical web may be flat. To separate the hot gas flow path 15 into acoustically decoupled sections the web 22 is reaching into the upstream end of the turbine 3, extending into the space confined by the inner platform 14 and outer platform 13. In this case, the web 22 ends upstream of the leading section of the extended vane 40. The vertical web 22 can be hollow comprising a resonator volume, which can be used for housing of a Helmholtz damper. Thus decoupling of neighboring combustors can be achieved by a combination of dampening with the Helmholtz damper and by at least partly blocking the fluid connection between two neighboring combustors. Typically, the extended vane 40 and web 22 should not touch each other to avoid mechanical damage of the parts.

It should be apparent that the foregoing relates only to the preferred embodiments of the present application and that numerous changes and modifications may be made herein by one of ordinary skill in the art without departing from the general spirit and scope of the invention as defined by the following claims.

LIST OF DESIGNATIONS

1 Compressor
2 Can combustor
3 Turbine
4 Generator
5 Low pressure cooling gas
6 High pressure cooling gas
7 Ambient air
8 Exhaust gas
9 Gas turbine
10 Vane
11 Combustor transition wall
12 Frame segment
13 Outer platform
14 Inner platform
15 Hot gas flow path
16 Vane carrier
17 Picture frame receptacle
20 Upper horizontal element
21 Lower horizontal element
22 Vertical web
24 Combustor transition piece
25 Fixation
27 Downstream face of the vertical web
35 Seal
40 Extended vane
41 Leading section
42 Trailing edge
43 Cooling fluid
44 Airfoil
45 Edge of the inner platform
50 Non-extended vane
51 Leading section
52 Trailing edge
53 Airfoil

The invention claimed is:

1. A first stage vane arrangement, comprising:
an array of first stage vanes; and
an array of frame segments for axially receiving aft ends of a combustor transition pieces, wherein
the array of first stage vanes include extended vanes, each extended vane having a leading section, a trailing edge, and an airfoil extending between an outer platform and an inner platform, and a plurality of non-extended vanes, each non-extended vane having a leading section, a trailing edge, and an airfoil extending between an outer platform and an inner platform, wherein at least one of the non-extended vanes is positioned between two extended vanes,
the array of frame segments including an I-beam with an upper horizontal element, a lower horizontal element, and a vertical web, the vertical web having a downstream face, facing towards a first stage of a turbine when installed in a gas turbine,
wherein the downstream face of the vertical web of at least one of the array of frame segments is overlapping when viewed in axial direction, at least partially, the leading section of at least one of the extended vanes, a first distance from the leading section of the extended vanes to an edge of the inner platform is equal for all the extended vanes and a second distance from the leading section of the non-extended vanes to the edge of the inner platform is larger than the first distance from the leading section of the extended vanes to the edge of the inner platform.

2. The first stage vane arrangement according to claim 1, wherein the downstream face of the vertical web of each of the frame segments is overlapping when viewed in axial direction, at least partially, the leading section of one of the extended vanes.

3. The first stage vane arrangement according to claim 1, wherein the number of the vertical web is equal to the number of the extended vanes.

4. The first stage vane arrangement according to claim 1, wherein the leading section of the extended vanes comprises cooling holes.

5. The first stage vane arrangement according to claim 1, wherein the leading section of at least one of the extended vanes is substantially flat and parallel to the downstream face of at least one vertical web.

6. The first stage vane arrangement according to claim 1, wherein a radius of curvature of the mean camber line from the trailing edge to the leading edge of at least one of the extended vanes is larger than a radius of curvature of the mean camber line from the trailing edge to the leading edge of the non-extended vanes.

7. The first stage vane arrangement according to claim 1, wherein an axial distance between the leading section of at least one of the extended vanes and the downstream face of the vertical web is between the first distance and the second distance.

8. The first stage vane arrangement according to claim 1, wherein an axial distance between the leading section of at least one of the extended vanes and the downstream face of the vertical web is smaller than a minimum thickness of the vertical web at the downstream face.

9. The first stage vane arrangement according to claim 1 wherein the vertical web of at least one of the array of frame segments is extending in axial direction beyond the edge of the inner platform.

10. The first stage vane arrangement of claim 1, wherein the leading section of at least one of the extended vanes has a convex shape and the downstream face of at least one of the vertical web has a concave shape.

11. A gas turbine with at least one compressor, at least one turbine, and at least one combustion chamber with a combustor transition piece, wherein the gas turbine comprises the first stage vane arrangement according to claim 1.

12. A method for cooling the array of frame segments of the first vane arrangement of claim 1, the method comprising steps:

supplying a cooling fluid to the interior of the extended vanes; guiding the cooling fluid to the leading section of the extended vanes; and ejecting the cooling fluid into a gap between the vertical web and the extended vanes.

* * * * *